(12) United States Patent
Giroud et al.

(10) Patent No.: US 10,113,589 B2
(45) Date of Patent: Oct. 30, 2018

(54) AXIALLY SELF-POSITIONING RADIAL SUPPORT BEARING

(71) Applicant: Koyo Bearings North America LLC, Westlake, OH (US)

(72) Inventors: Vincent Giroud, Duppigheim (FR); Christophe Artur, Colmar (FR)

(73) Assignee: KOYO BEARINGS NORTH AMERICA LLC, Westlake, OH (US)

( * ) Notice: Subject to any disclaimer, the term of this patent is extended or adjusted under 35 U.S.C. 154(b) by 0 days.

(21) Appl. No.: 15/849,035

(22) Filed: Dec. 20, 2017

(65) Prior Publication Data

US 2018/0112713 A1   Apr. 26, 2018

Related U.S. Application Data

(62) Division of application No. 14/774,758, filed as application No. PCT/US2013/030878 on Mar. 13, 2013, now Pat. No. 9,850,947.

(51) Int. Cl.

| F16C 43/04 | (2006.01) |
|---|---|
| F16C 33/46 | (2006.01) |
| F16C 43/06 | (2006.01) |
| F16C 19/46 | (2006.01) |
| F16C 23/08 | (2006.01) |
| F16C 41/04 | (2006.01) |

(52) U.S. Cl.
CPC ........ *F16C 33/4605* (2013.01); *F16C 19/463* (2013.01); *F16C 19/466* (2013.01); *F16C 23/08* (2013.01); *F16C 33/4635* (2013.01); *F16C 41/045* (2013.01); *F16C 43/06* (2013.01); *F16C 2226/74* (2013.01); *F16C 2360/18* (2013.01)

(58) Field of Classification Search
CPC ...... F16C 19/46; F16C 19/463; F16C 19/466; F16C 33/4605; F16C 33/4635; F16C 41/045
See application file for complete search history.

(56) References Cited

U.S. PATENT DOCUMENTS 2,818,313 A * 12/1957 Gales ...................... F16C 19/46
29/898.061

FOREIGN PATENT DOCUMENTS

| EP | 2551539 A1 * | 1/2013 | .............. F16C 35/06 |
| FR | 1357455 A * | 4/1964 | ............ F16C 19/466 |

* cited by examiner

*Primary Examiner* — Phillip A Johnson
(74) *Attorney, Agent, or Firm* — Nelson Mullins Riley & Scarborough LLP

(57) ABSTRACT

A radial support bearing having a cylindrical cage including a central portion, a first end portion and a second end portion, the central portion defining a plurality of roller pockets, and at least one projection extending radially inwardly from an inner surface of the cage, a plurality of rollers, each roller being disposed in a respective roller pocket, a cylindrical outer sleeve disposed about an outer surface of the cage so that the inner surface of the outer sleeve is adjacent the plurality of rollers, and an o-ring adapted to be axially fixed relative to the shaft. The o-ring is slidably received between the at least one projection of the cage and the central portion of the cage so that the cage is axially fixed with respect to the shaft.

19 Claims, 10 Drawing Sheets

AXIALLY SELF-POSITIONING RADIAL SUPPORT BEARING

The present application is a divisional application of U.S. application Ser. No. 14/774,758 filed Sep. 11, 2015, now U.S. Pat. No. 9,850,947, which is a National Phase Entry of Patent Cooperation Treaty Application PCT/US2013/030878 filed Mar. 13, 2013, which are hereby incorporated by reference in their entirety into the specification of this application.

FIELD OF THE INVENTION

The present invention relates generally to support bearings. More particularly, the present invention relates to a radial support bearing assembly for use with a camshaft, integrating an axial self-positioning feature.

BACKGROUND OF THE INVENTION

One construction of a prior art radial support bearing assembly for supporting a camshaft includes a cage, an outer race, and a plurality of needle roller elements. Additionally, an inner race can also be provided so that the inner raceway for the needle roller elements is not directly on the outer surface of the camshaft. Typically, the support bearing assembly is positioned within a corresponding cylinder head and the cylinder head maintains the support bearing assembly in a predetermined position, coaxial with the camshaft. As such, the support bearing assembly provides a low friction support mechanism for allowing the camshaft to rotate in place (e.g., within the cylinder head of an internal combustion engine).

By definition, the outer race of the bearing assembly is clamped in the cylinder head and does not rotate with the camshaft. The needle roller elements contact the outer surface of the camshaft (when a separate inner race is not provided) and experience rolling engagement therewith. The clamping of the outer race in the block provides some resistance to axial movement of the outer race, but does not guarantee the proper alignment with the rolling elements. Therefore, the initial installation of the support bearing assembly in the block is complicated by the lack of any means for positively axially positioning the radial bearing assembly relative to either the block or the camshaft.

Additional issues arise in many prior art radial support bearing assemblies in those instances in which the distance along the camshaft between adjacent cam lobes is substantially greater than the axial length of the cage of the bearing. More specifically, in these instances, it is possible that the cage and, therefore, needle roller elements move axially along the camshaft relative to the outer race of the bearing. Mispositioning of the needle roller elements can lead to imbalanced loads, increased wear, reduced roller life, etc. To alleviate these issues, prior art bearing assemblies exist in which the axial length of the cage is increased to match the distance between adjacent cam lobes. However, when cage length is increased without similar length increases in the needle rollers, dynamic behavior of the bearing can be affected. As well, increasing the axial length of the cage, and possibly rollers, may lead to increased manufacturing costs due to the use of extra material and the need for more accurate tolerances.

The present invention recognizes and addresses considerations of prior art constructions and methods.

SUMMARY OF THE INVENTION

One embodiment of a radial support bearing for use with a shaft, in accordance with the present disclosure, includes a substantially cylindrical cage having a central portion extending between a first end portion and a second end portion, the central portion defining a plurality of roller pockets, and at least one projection extending radially inwardly from an inner surface of the cage adjacent the first end portion, a plurality of rollers, each roller being disposed in a respective roller pocket, a substantially cylindrical outer sleeve having an inner surface and an outer surface, the outer sleeve being disposed about an outer surface of the cage so that the inner surface of the outer sleeve is adjacent the plurality of rollers, and an o-ring adapted to be axially fixed relative to the shaft. The o-ring is slidably received between the at least one projection of the cage and the central portion of the cage so that the cage is axially fixed with respect to the shaft.

Another embodiment of a radial support bearing for use with a shaft defining an annular groove in its outer surface, in accordance with the present disclosure includes a substantially cylindrical cage having a central portion extending between a first end portion and a second end portion, the central portion defining a plurality of roller pockets, and at least one projection extending radially inwardly from an inner surface of the cage, a plurality of rollers, each roller being disposed in a respective roller pocket, and a substantially cylindrical outer sleeve having an inner surface and an outer surface, the outer sleeve being disposed about an outer surface of the cage so that the inner surface of the outer sleeve is adjacent the plurality of rollers. The at least one projection is operatively engaged with the annular groove in the shaft so that the cage is axially fixed with respect to the shaft.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1A:
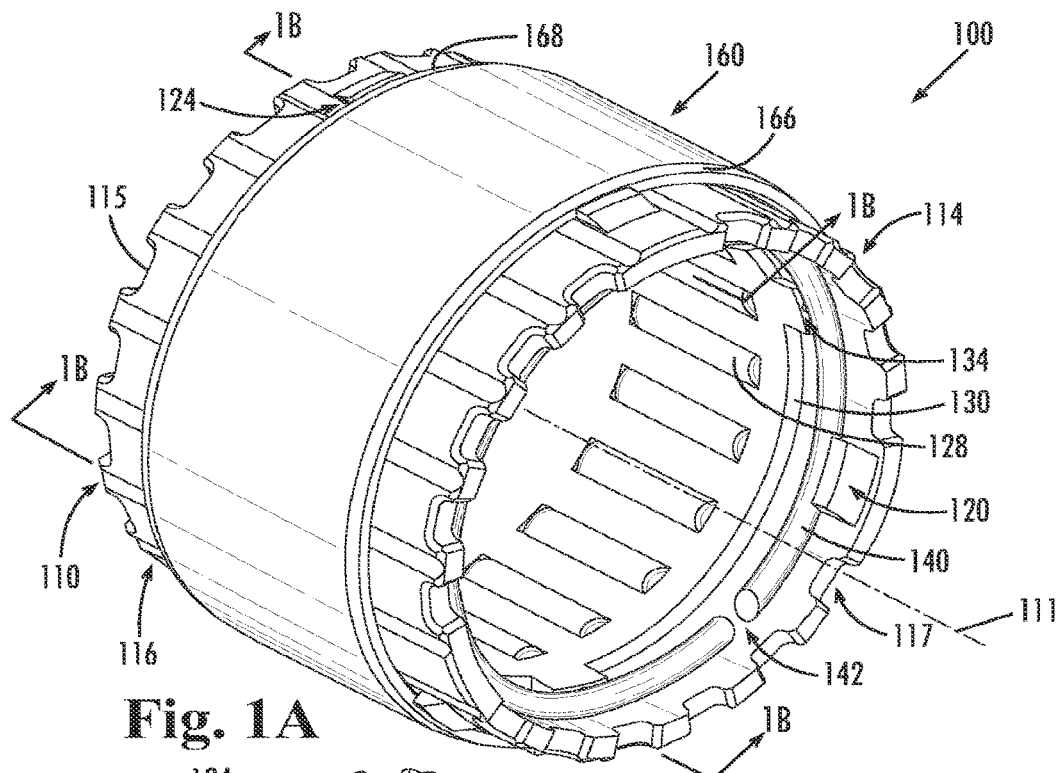
FIG. 1A is a perspective view of a first embodiment of a radial support bearing assembly in accordance with the present disclosure.

Repeat use of reference characters in the present specification and drawings is intended to represent same or analogous features or elements of the invention according to the disclosure.

DETAILED DESCRIPTION

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the figures, as shown in FIGS. 1A through 1D, an embodiment of a radial support bearing assembly 100 in accordance with the present disclosure includes a substantially-cylindrical cage 110 defining a plurality of roller pockets 118, a plurality of roller elements 128, each roller element 128 being rotatably received by a corresponding roller pocket 118, a cylindrical outer sleeve 160 disposed adjacent an outer surface of cage 110, and an o-ring 140 received in a first end portion 114 of cage 110, as discussed in greater detail below. Roller elements 128, more specifically, needle roller elements, are rotatably received between, and in rolling contact with, an outer raceway defined by a cylindrical inner surface 162 of outer sleeve 160 and a cylindrical outer surface of the supported shaft 102 (FIG. 1D), once radial support bearing assembly 100 is mounted on shaft 102. Preferably, roller pockets 118 are constructed such that each roller element 128 is allowed to extend only partially beyond an inner surface 126 of cage 110. As such, radial support bearing assembly 100 is maintainable in a fully unitized, assembled state prior to installation on a corresponding camshaft in that roller elements 128 are retained in the radially inward direction by roller pockets 118 and in the radially outward direction by outer sleeve 160.

In the embodiment shown, cage 110 includes a first plurality of projections, or clips 124, depending radially outwardly therefrom to axially retain outer sleeve 160 on a central portion 112 cage 110. More specifically, three pairs of first clips 124 are equally spaced about the outer surface of cage 110, one clip in each pair being disposed on first end portion 114 of cage 110 whereas the other clip in each pair is disposed on a second end portion 116 of cage 110. Each first clip 124 includes a leading edge 124a disposed toward its respective end of cage 110 and a trailing edge 124b disposed toward the other clip of the pair. Leading edge 124a of each first clip 124 defines an obtuse angle with the outer surface of cage, whereas trailing edge 124b of each first clip 124 is substantially perpendicular to the outer surface of the cage. As such, leading edges 124a of each first clip 124 facilitate slidably positioning outer sleeve 160 adjacent the outer surface of cage 110, whereas trailing edges 124b of the clips facilitate retaining outer sleeve 160 in the desired position.

Figure 1B:
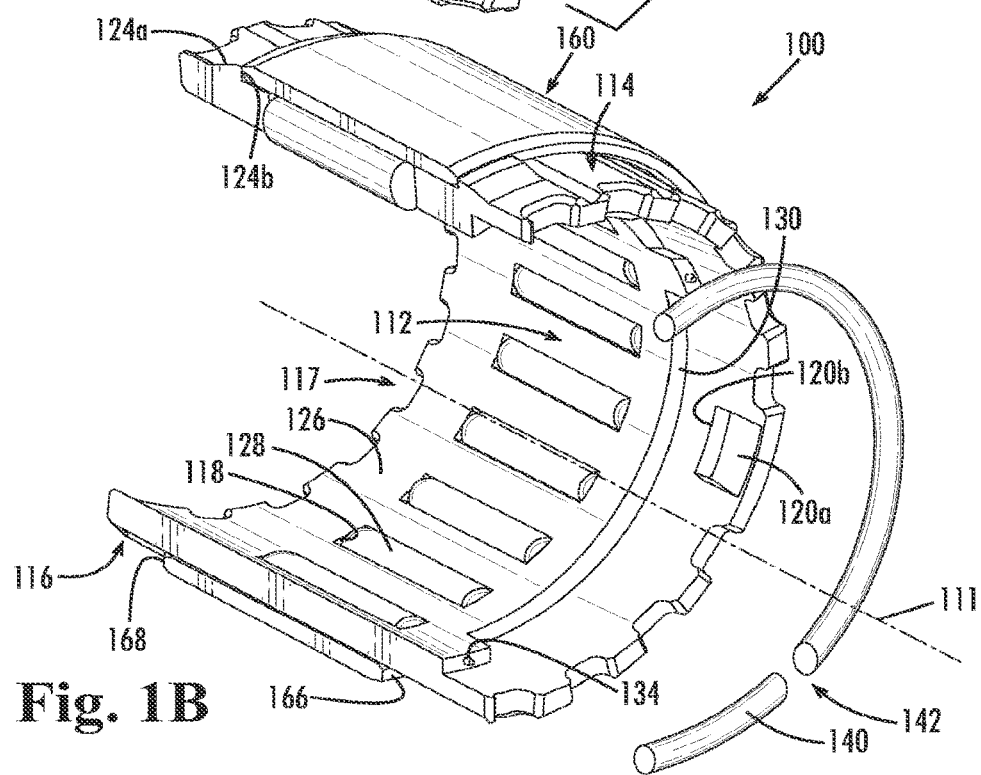
FIG. 1B is a perspective, cross-sectional view of the radial support bearing assembly as shown in FIG. 1A, taken along line 1B-1B.
Figure 1C:
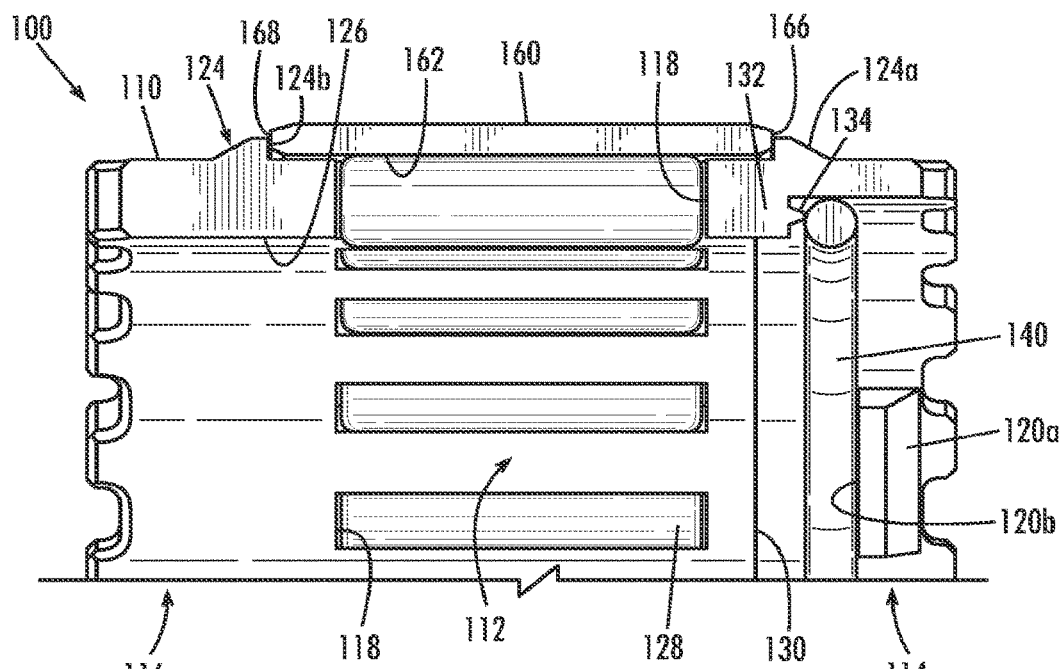
FIG. 1C is a partial, cross-sectional plan view of the radial support bearing assembly as shown in FIG. 1A.
Figure 1D:
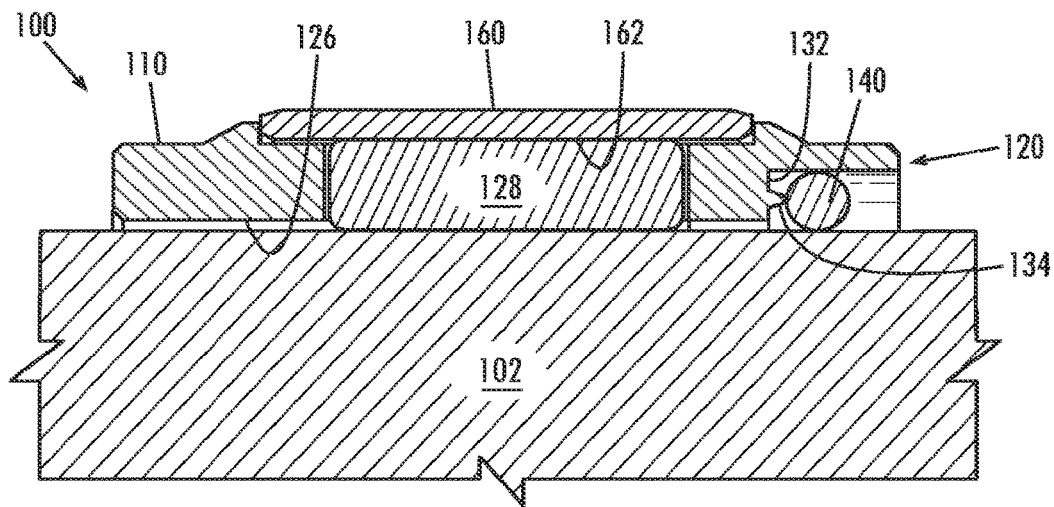
FIG. 1D is a partial, cross-sectional plan view of the radial support bearing assembly, as shown in FIG. 1A, mounted on a corresponding camshaft.

As best seen in FIG. 1C, once assembled, trailing edges 124b of first clips 124 are substantially parallel to, and separated by a distance substantially equal to the distance between, end faces 166 and 168 of outer sleeve 160. As such, first clips 124 limit axial movement of outer sleeve 160 relative to cage 110. By securing outer sleeve 160 axially relative to cage 110, first clips 124 enable support bearing assembly 100 to be pre-assembled onto camshaft 102 so that outer sleeve 160 is automatically located in the desired position for being received in the corresponding cylinder head (not shown), eliminating the need for an assembler machine to position outer sleeve 160 relative to the cylinder head during assembly.

As shown, cage 110 also includes a second plurality of projections, or clips 120, depending radially inwardly from the cylindrical inner surface of first end portion 114. Preferably, three second clips 120 are equally spaced about the inner surface of first end portion 114. Each second clip 120 includes a leading edge 120a disposed toward its respective end of cage 110 and a trailing edge 120b disposed toward central portion 112 of cage 110. Leading edge 120a of each second clip 120 defines an angle with the inner surface of the cage's first end portion 114, whereas trailing edge 120b of each second clip 120 is substantially perpendicular to the inner surface of first end portion 114. The construction of leading edges 120a of each second clip 120 facilitates slidably positioning o-ring 140 within cage 110, whereas trailing edges 120b of the clips facilitate retaining o-ring 140 within the cage.

As best seen in FIGS. 1B and 1C, cage 110 further includes an annular ledge 130 depending radially outwardly from the inner surface of the cage's central portion 112 to the inner surface of the cage's first end portion 114. Annular ledge 130 lies in a plane that is transverse to a longitudinal center axis 111 of cage 110. Cage 110 further includes a plurality of axial projections 134 extending outwardly from annular ledge 130. As shown, cage 110 preferably includes three axial projections 134 that are circumferentially offset from second clips 120. Additionally, the distal ends of axial projections 134 are axially offset from trailing edges 120b of the plurality of second clips 120 by a distance that is substantially equal to the diameter of the o-ring's cross-section taken parallel to the assembly's center axis 111, as best seen in FIG. 1C. As such, when assembled, o-ring 140 is axially positioned within cage 110 by both trailing edges 120b of second clips 120 and axial projections 134.

Axial projections 134 are configured to wear down as cage 110 rotates relative to o-ring 140 until interference is nearly or completely eliminated and or a minute axial clearance is created. This prevents undue resistance to rotation of the o-ring 140, and shaft 102 to which is rotationally and axially fixed, to cage 110 of the support bearing assembly. As shown, each axial projection 134 depends outwardly from a corresponding base portion 132 which extends outwardly from annular ledge 130. Note, however, in alternate embodiments, axial projections 134 may depend outwardly directly from annular ledge 130.

As best seen in FIGS. 1A and 1C, o-ring 140 is assembled within cage 110 prior to assembling support bearing assembly 100 on shaft 102. As shown, o-ring 140 is a split ring formed of metal with a gap 142 that allows for the outermost diameter of the o-ring to contract or expand as o-ring 140 is inserted into cage 110 or mounted on shaft 102, respectively. When inserted into cage 110, leading edges 120a of second clips 120 cam the abutting portions of o-ring 140 inwardly as o-ring 140 passes over the plurality of second clips 120. In short, as the size of gap 142 is reduced, the outermost diameter of o-ring 140 is reduced slightly. Once o-ring 140 is fully received between axial projections 134 and trailing edges 120b of second clips 120, gap 142 returns to its unbiased size, as does the outermost diameter of the o-ring, and o-ring 140 is seated within the cage.

The innermost diameter of o-ring 140 is slightly less than the outermost diameter of shaft 102, a camshaft in the present case, on which support bearing assembly 100 is to be mounted. Gap 142 allows o-ring 140 to open slightly as support bearing assembly 100 is slid along camshaft 102 to the desired axial position. The dimensions of o-ring 140 are selected such that the force exerted by o-ring 140 on camshaft 102 is adequate for maintaining support bearing assembly 100 in the desired axial position relative to the camshaft during assembly of camshaft 102 into the corresponding cylinder head, as well as during operations of the corresponding engine. Note, the resulting outermost diameter of o-ring 140 after installation on shaft 102 is configured to be slightly less than the diameter of the cage's first end portion 114 inner wall so that cage 110 rotates freely about o-ring 140 once installed. Alternately, it is possible to axially position o-ring 140 on camshaft 102 prior to installing the remainder of support bearing assembly 100.

As well, cage 110 includes a plurality of crenels 117 formed about its first and second end portions 114 and 116, as well as a plurality of oil grooves 115 defined in its outer surface. Crenels 117 and oil grooves 115 are configured to enhance lubrication of the bearing assembly during operation. Cage 110 is preferably constructed of Polymer, or like materials such as, but not limited to, Polyamide.

Figure 2A:
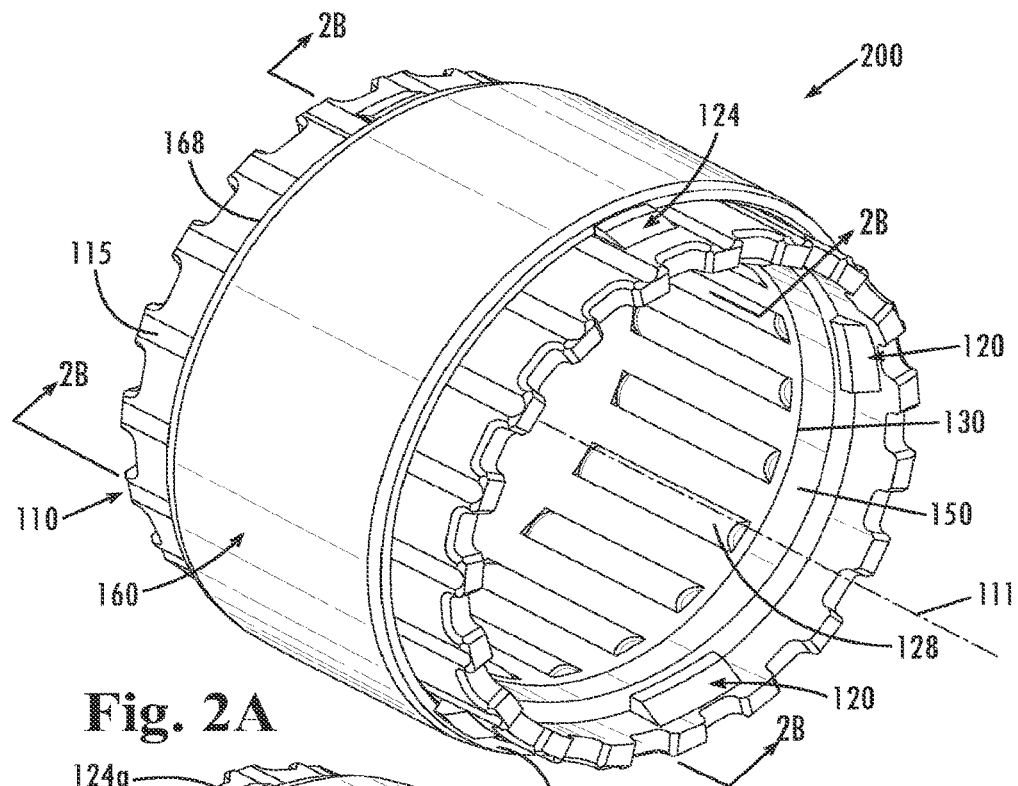
FIG. 2A is a perspective view of a second embodiment of a radial support bearing assembly in accordance with the present disclosure.
Figure 2B:
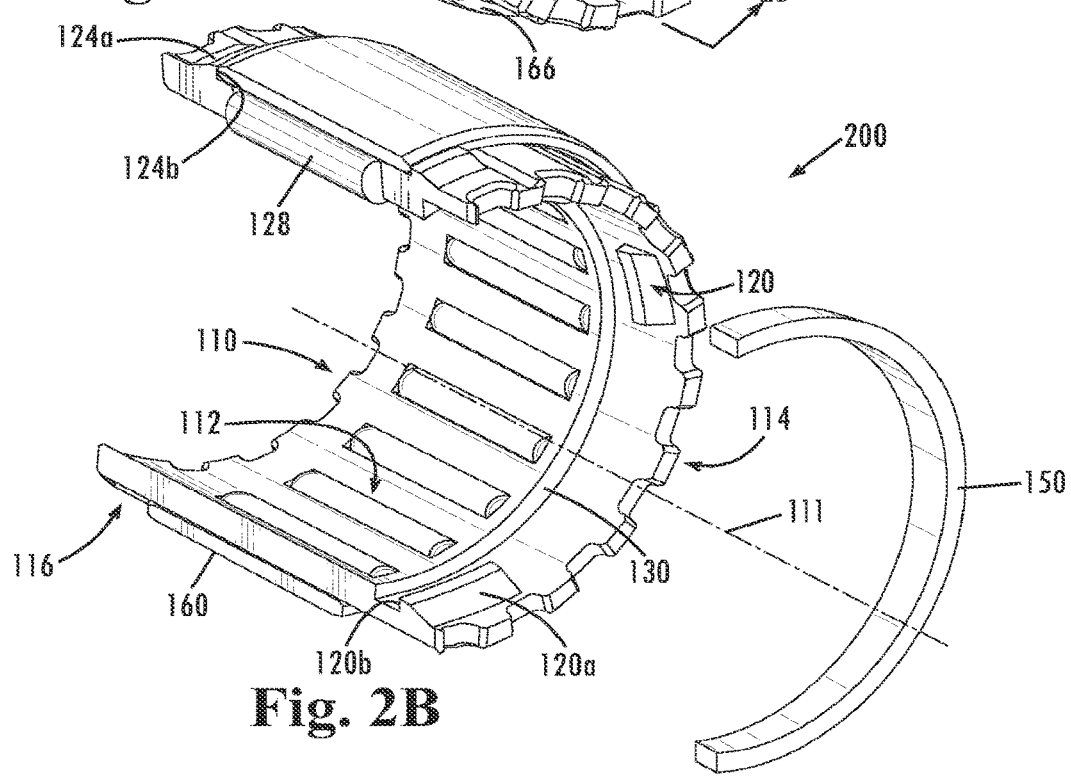
FIG. 2B is a partial, cross-sectional view of the radial support bearing assembly, as shown in FIG. 2A, taken along line 2B-2B.

Referring now to FIGS. 2A and 2B, a second embodiment of a radial support bearing assembly 200 in accordance with the present disclosure is shown. The second embodiment is substantially similar to the first embodiment, with similar elements having the same reference numbers. The second embodiment differs from the previously discussed first embodiment in that a continuous o-ring 150 is utilized rather than a split o-ring 140, as in the first embodiment. As well, o-ring 150 is preferably constructed of plastic, or like materials, rather than metal, as was the split o-ring 140. As well, as best seen in FIG. 2B, cage 110 of the second embodiment does not include a plurality of axial projections depending outwardly from annular ledge 130. As such, o-ring 150 is received directly adjacent annular ledge 130 when disposed within the first end portion of cage 110.

Similarly to the first embodiment, o-ring 150 is assembled with cage 110 prior to installing support bearing assembly 200 on the corresponding shaft. As such, support bearing assembly 200 is maintainable in a fully unitized, assembled state prior to its installation on the corresponding camshaft. In use, the fully assembled support bearing assembly 200 is slid along the camshaft to the desired axial position. The dimensions of o-ring 150 are selected such that the frictional forces between the inner surface of o-ring 150 and the outer surface of the camshaft are adequate for maintaining support bearing assembly 200 in the desired axial position during assembly of the camshaft into the corresponding cylinder head, as well as during operations of the corresponding engine. Note, the outermost diameter of o-ring 150 after installation on the corresponding shaft is configured to be slightly less than the diameter of the cage's first end portion 114 inner wall so that cage 110 rotates freely about o-ring 150. Alternately, o-ring 150 may be installed on the camshaft in a press-fit prior to installation of the remaining components of support bearing assembly 200.

Figure 2C:
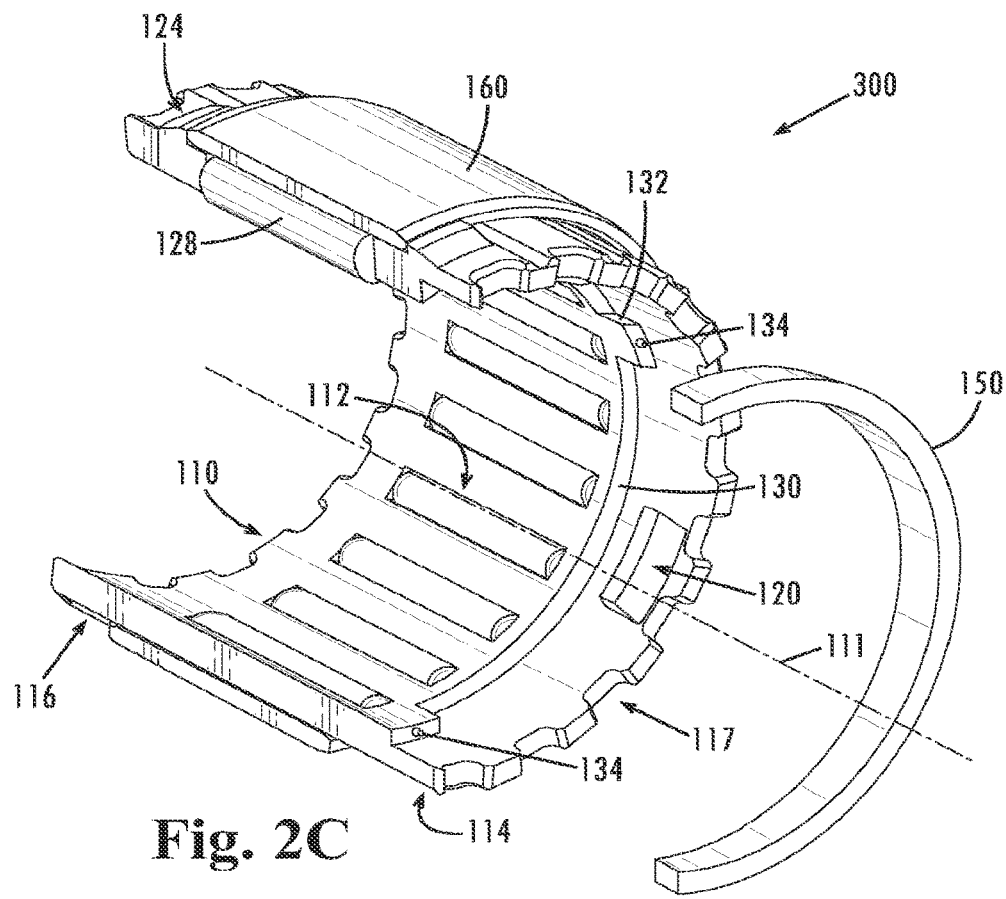
FIG. 2C is a partial, cross-sectional view of a third embodiment of a radial support bearing assembly in accordance with the present disclosure.
Figure 2D:
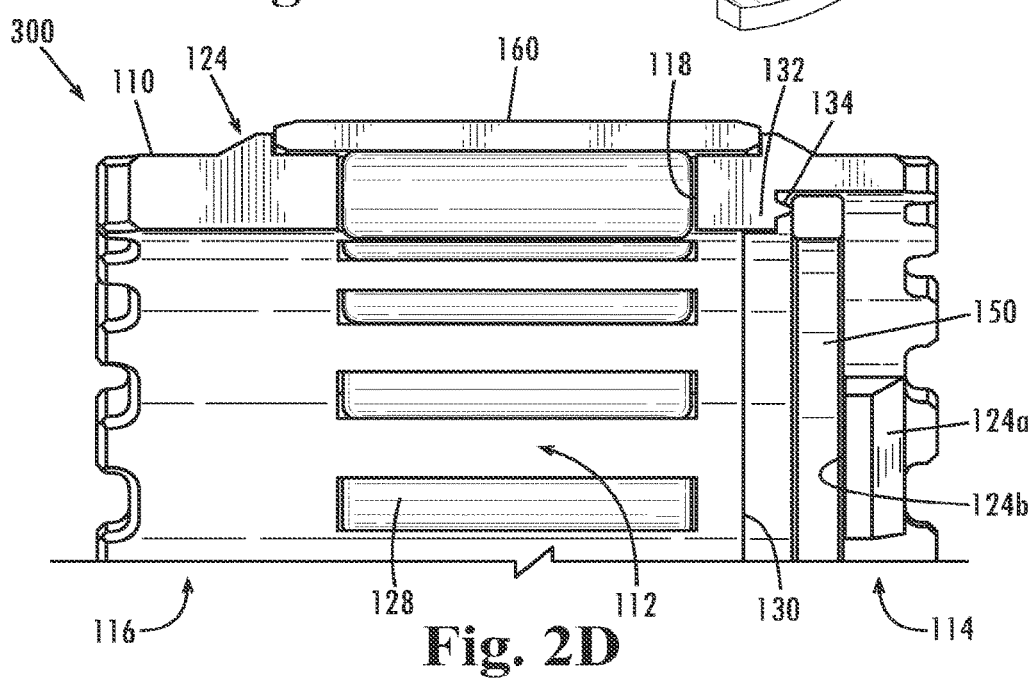
FIG. 2D is a partial, cross-sectional plan view of the radial support bearing assembly shown in FIG. 2C.

Referring now to FIGS. 2C and 2D, a third embodiment of a radial support bearing assembly 300 in accordance with the present disclosure is shown. The third embodiment is substantially similar to the second embodiment, with similar elements having the same reference numbers. The third embodiment differs only from the previously discussed second embodiment in that a plurality of axial projections 134 depend outwardly from annular ledge 130. Annular projections 134 are constructed, and function, identically to those discussed in the first embodiment.

Figure 3A:
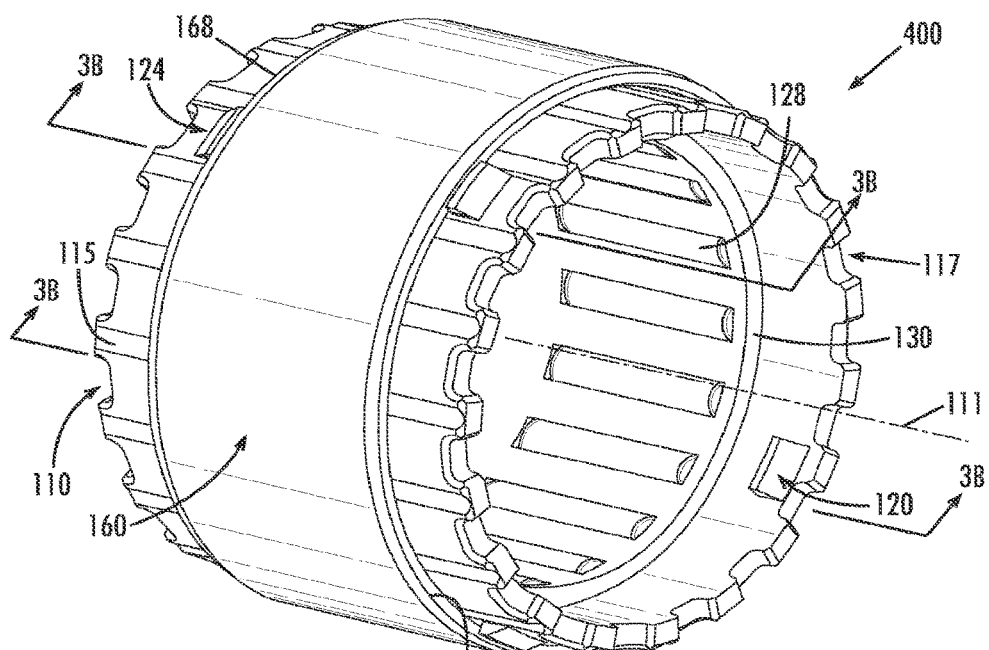
FIG. 3A is a perspective, cross-sectional view of a fourth embodiment of a radial support bearing assembly in accordance with the present disclosure.
Figure 3B:
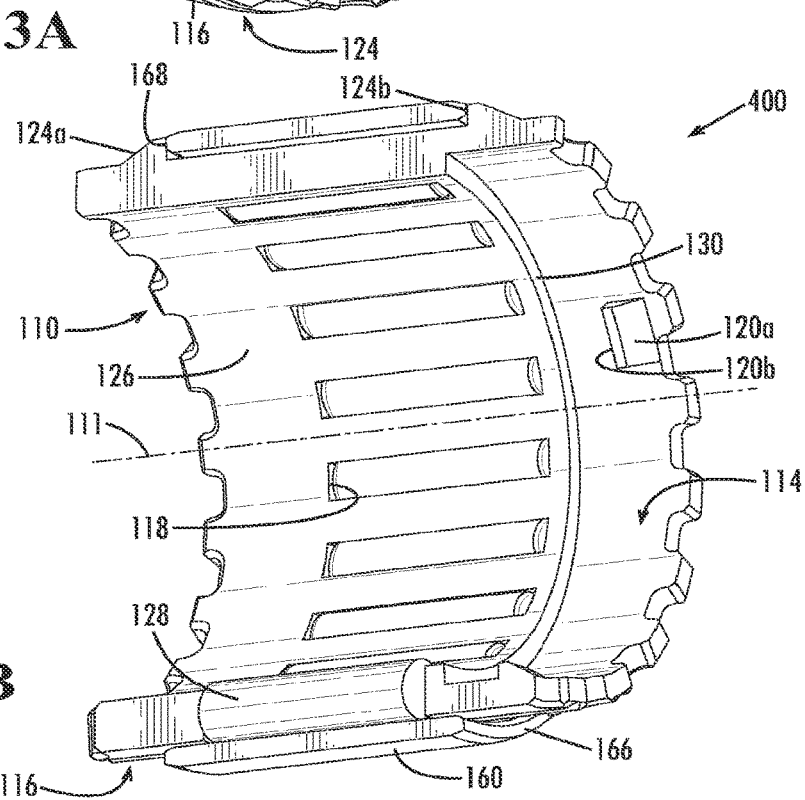
FIG. 3B is a partial, cross-sectional view of the radial support bearing assembly, as shown in FIG. 3A, taken along line 3B-3B.
Figure 3C:
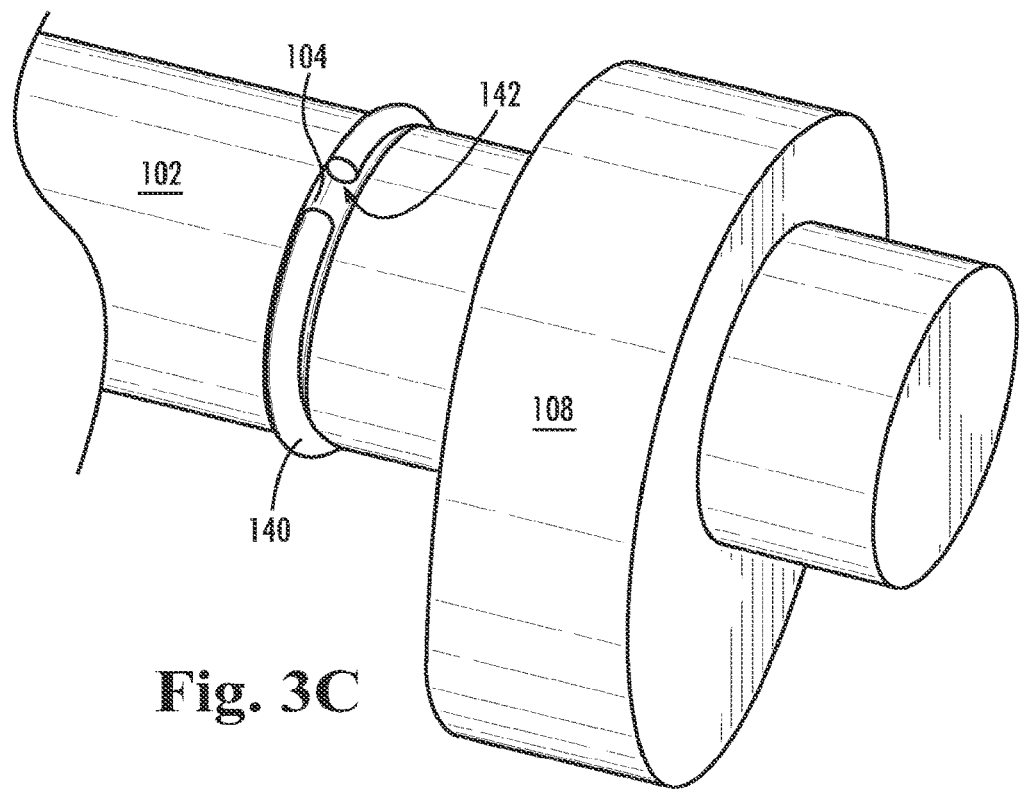
FIG. 3C is a perspective view of an o-ring of the radial support bearing assembly, as shown in FIG. 3A, mounted on a camshaft.
Figure 3D:
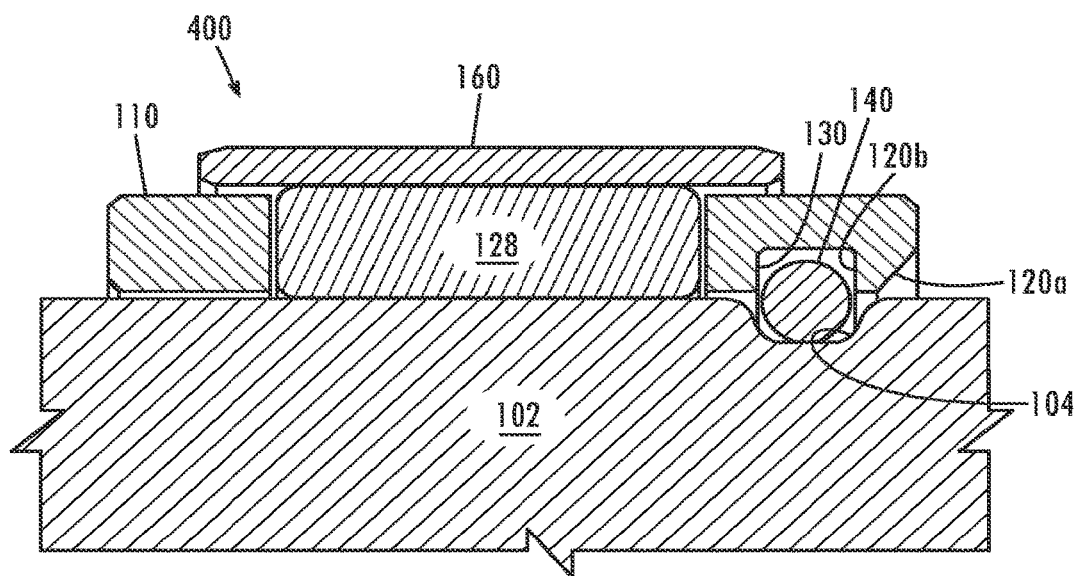
FIG. 3D is a partial, cross-sectional plan view of the radial support bearing assembly, as shown in FIG. 3A, mounted on the camshaft shown in FIG. 3C.

Referring now to FIGS. 3A through 3D, a fourth embodiment of a radial support bearing assembly 400 in accordance with the present disclosure is shown. The fourth embodiment is substantially similar to the first embodiment, with similar elements having the same reference numbers. The fourth embodiment differs from the previously discussed first embodiment in that o-ring 140 is axially fixed relative to camshaft 102, and therefore cam lobe 108, by being received in an annular groove 104 defined in the outer surface of the camshaft, as shown in FIGS. 3C and 3D, rather than being axially retained by friction, as in the first embodiment. As well, cage 110 of the fourth embodiment does not include a plurality of axial projections depending outwardly from annular ledge 130, although they could be included in alternate embodiments.

Similarly to the first embodiment, o-ring 140 is preferably assembled with cage 110 prior to installing support bearing assembly 400 on the corresponding camshaft. As such, radial support bearing assembly 400 is maintainable in a fully unitized, assembled state prior to its installation on the corresponding camshaft. In use, the fully assembled support bearing assembly 400 is slid along shaft 102 until o-ring 140 is axially aligned with annular groove 104 of the shaft. As in the first embodiment, the innermost diameter of o-ring 140 is less than the outermost diameter of shaft 102. As before, gap 142 of o-ring 140 allows o-ring 140 to expand slightly as it slides along the outer surface of camshaft 102. However, upon reaching annular groove 104, the o-ring returns to its original, unbiased dimensions, thereby "snapping" into the annular groove. As best seen in FIG. 3D, the cross-sectional diameter of the o-ring taken parallel to the center axis 111 of the bearing assembly is greater than the depth of annular groove 104. As such, the o-ring extends radially outwardly beyond the outer surface of camshaft 102 into the recesses defined between annular ledge 130 of cage 110 and trailing edges 120b of second clips 120. The abutment of annular ledge 130 and trailing edges 120b of second clips 120 with o-ring 140 retain support bearing assembly 200 in the desired axial position relative to shaft 102. Alternately, it is possible to axially position o-ring 140 on camshaft 102 prior to installing the remainder of support bearing assembly 100.

Figure 4A:
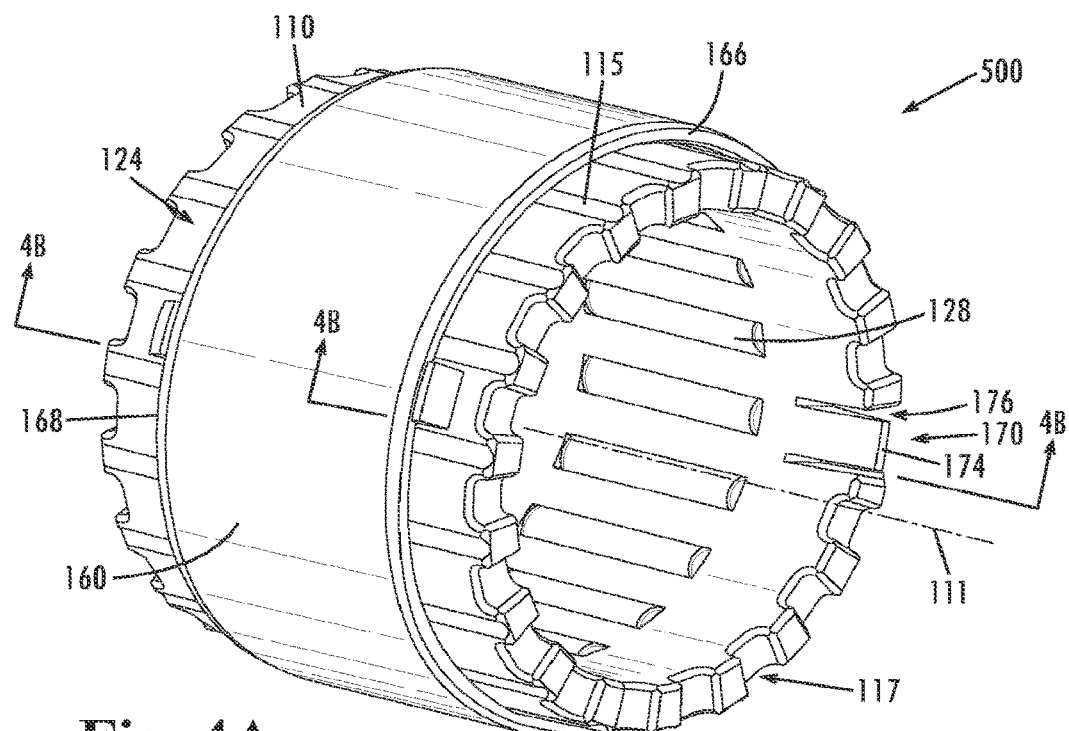
FIG. 4A is a perspective view of a fifth embodiment of a radial support bearing assembly in accordance with the present disclosure.
Figure 4B:
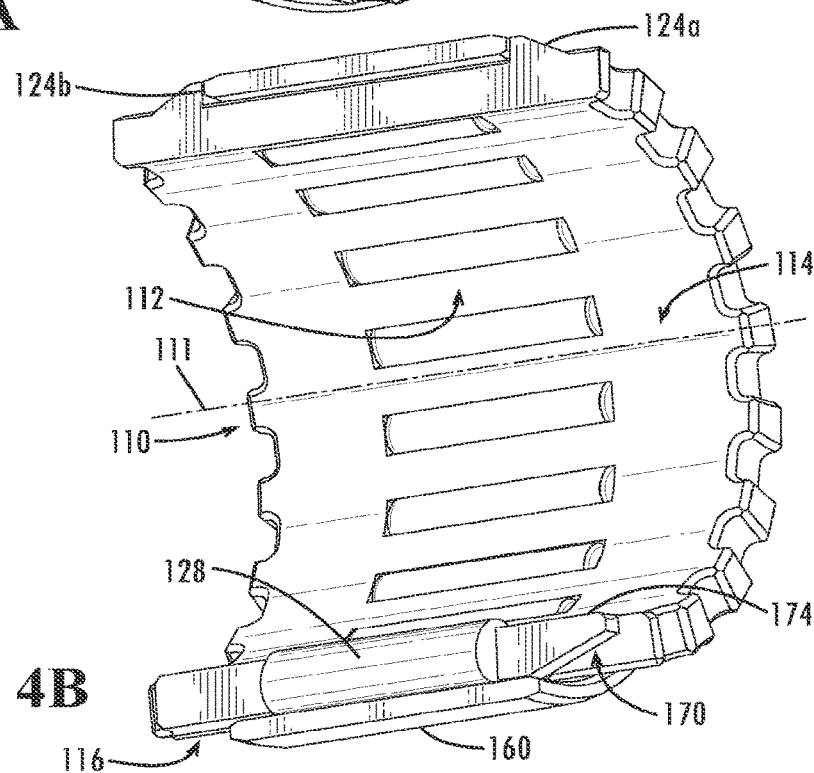
FIG. 4B is a perspective, cross-sectional view of the radial support bearing assembly as shown in FIG. 4A, taken along line 4B-4B.
Figure 4C:
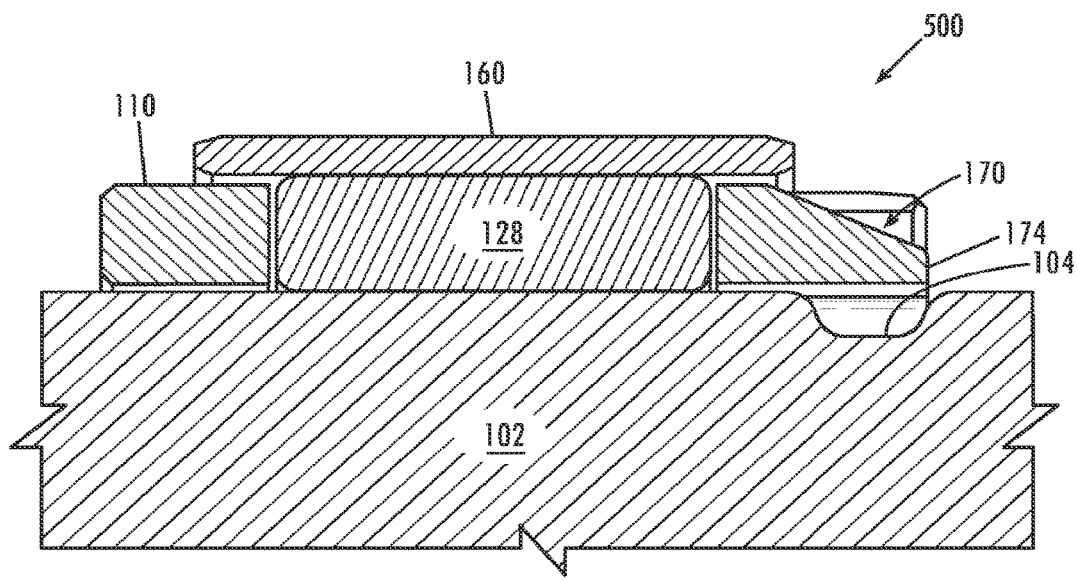
FIGS. 4C and 4D are partial, cross-sectional plan views of the radial support bearing assembly as shown in FIG. 4A, being mounted on a camshaft.
Figure 4D:
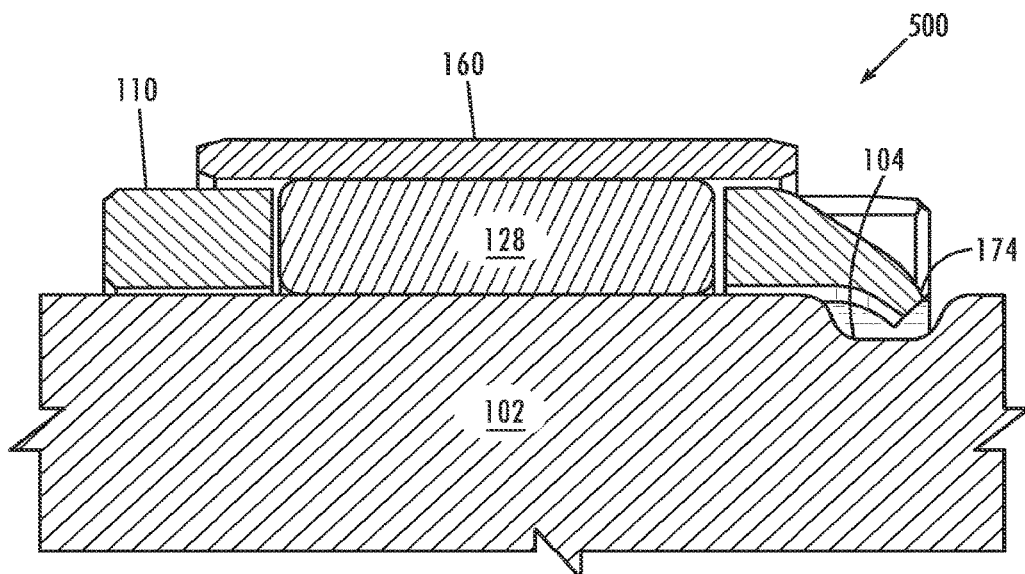

Referring now to FIGS. 4A through 4D, a fifth embodiment of a radial support bearing assembly 500 in accordance with the present disclosure is shown. The fifth embodiment differs primarily from the previously discussed embodiments in that an o-ring is not utilized in axially positioning support bearing assembly 500 relative to the corresponding camshaft. Rather, cage 110 of support bearing assembly 500 includes an axially extending, deformable projection, or tab, disposed on first end portion 114 of the cage. Preferably, tab 170 includes a tapered distal end 174 and is separated circumferentially at its sides from the cage by a pair of gaps 176. In use, support bearing assembly 500 is slid along camshaft 102 until deformable tab 170 is disposed adjacent a corresponding annular groove 104 defined in the outer surface of the shaft, as shown in FIG. 4C. Once positioned, distal end 174 of tab 170 is deformed radially inwardly into annular groove 104. Deformation of the tab's distal end 174 can be accomplished through ultrasonic heating, thermal heating, exertion of force, etc., until the distal end extends inwardly into the annular groove. Interaction between the tab's distal end 174 and the side walls of annular groove 104 maintain support bearing assembly 500 in the desired axial position relative to camshaft 102.

Figure 5A:
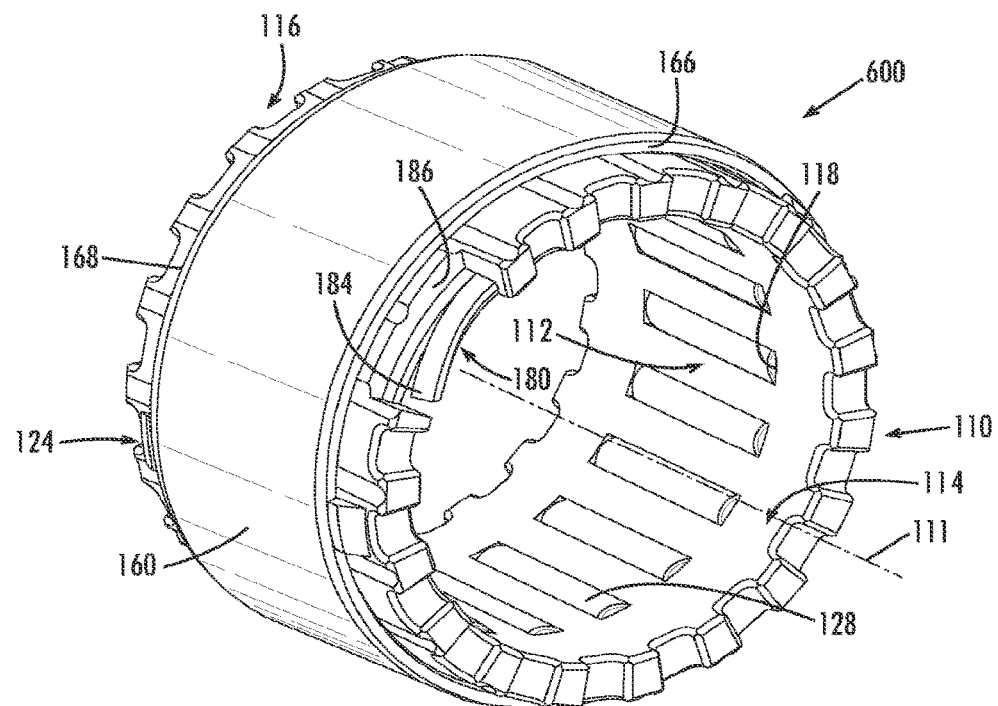
FIG. 5A is a perspective view of a sixth embodiment of a radial support bearing assembly in accordance with the present disclosure.
Figure 5B:
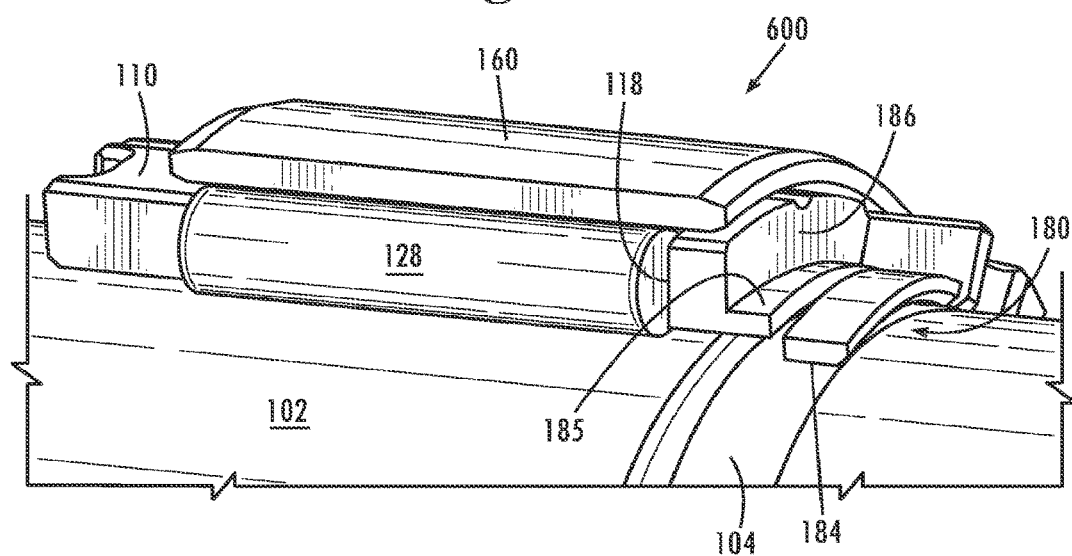
FIG. 5B is a partial, perspective cross-sectional view of the radial support bearing assembly, as shown in FIG. 5A, mounted on a camshaft.

Referring now to FIGS. 5A and 5B, a sixth embodiment of a radial support bearing assembly 600 in accordance with the present disclosure is shown. The sixth embodiment is substantially similar to the fifth embodiment, with similar elements having the same reference numbers. The sixth embodiment differs primarily from the fifth embodiment in the construction of its deformable projection, or tab 180. As shown, deformable tab 180 includes a base portion that is secured to first end 114 of cage 110 and a distal end 184 that extends both radially inward from, and circumferentially away from, the base portion of tab 180. Tab 180 is formed by a split-away portion of a thin walled section 185 of the cage. This walled section 185 is created by forming a recess inwardly into first end portion 114 of the cage from its axial edge. The reduced thickness of wall section 185 facilitates being able to form deformable tab 180 with reduced force and, therefore, reduced likelihood of adversely affecting the remainder of cage 110.

In use, support bearing assembly 600 is slid along camshaft 102 until deformable tab 180 is disposed adjacent the corresponding annular groove 104 defined in the outer surface of the camshaft. Distal end 184 of tab 180 is then deformed radially inwardly into annular groove 104. Interaction between the tab's distal end 184 and the side walls of annular groove 104 maintain support bearing assembly 600 in the desired axial position relative to camshaft 102. Alternately, distal end 184 can be deformed radially inwardly prior to installation of support bearing assembly 600 on camshaft 102. In this configuration, support bearing assembly 600 is slid along camshaft 102 until deformable tab 180 reaches annular groove 104, at which point its distal end 184 automatically springs radially inwardly into the groove.

Figure 6A:
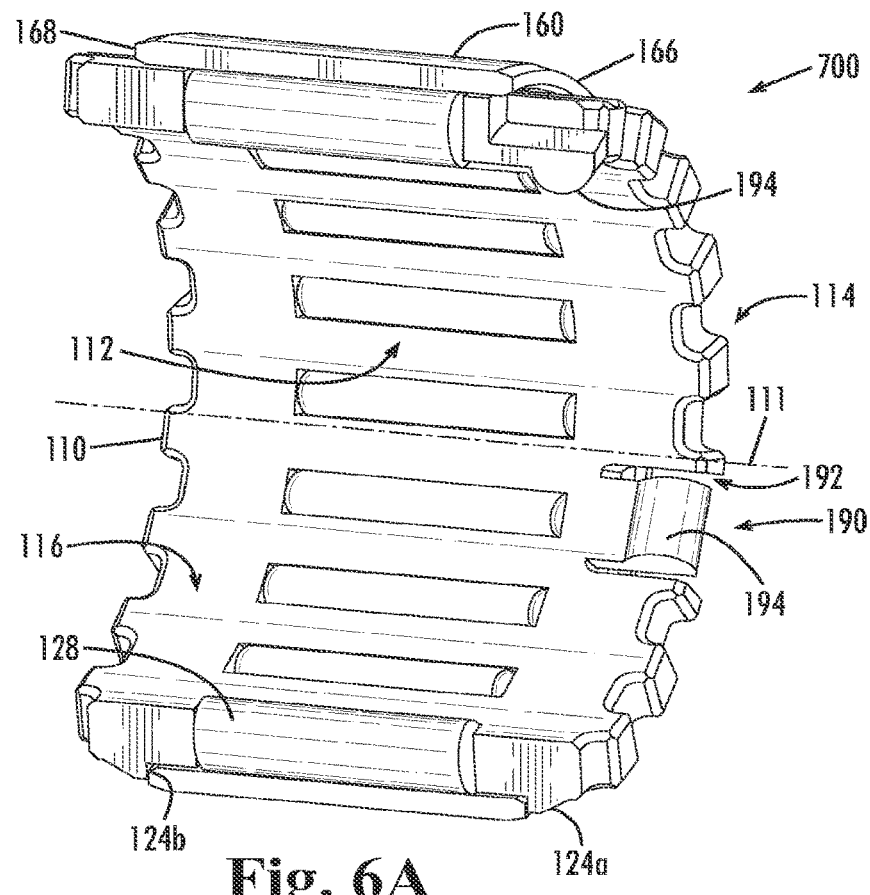
FIG. 6A is a perspective, cross-sectional view of a seventh embodiment of a radial support bearing assembly in accordance with the present disclosure.
Figure 6B:
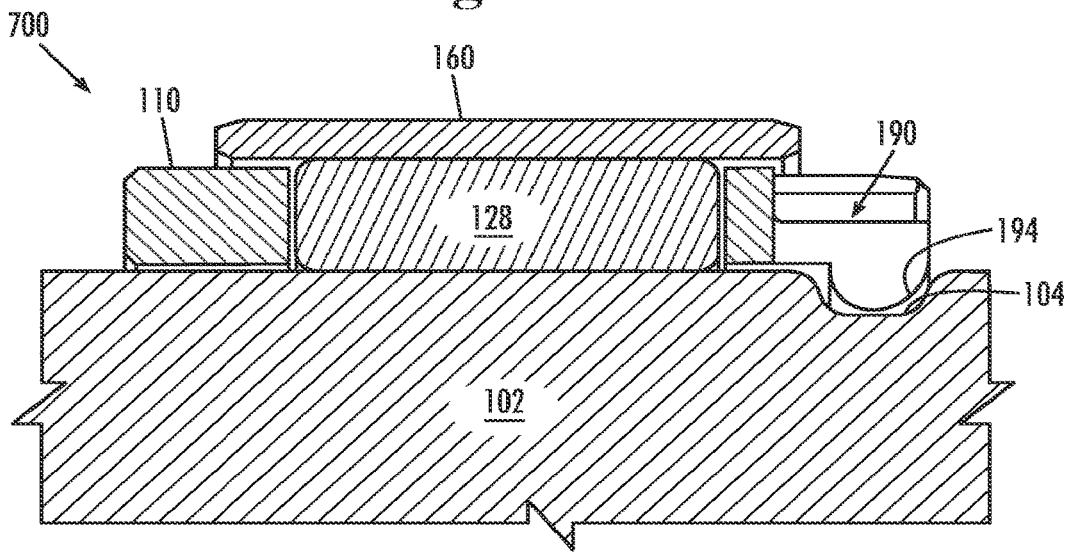
FIG. 6B is a partial, cross-sectional plan view of the radial support bearing assembly, as shown in FIG. 6A, mounted to a camshaft.

Referring now to FIGS. 6A and 6B, a seventh embodiment of a radial support bearing assembly 700 in accordance with the present disclosure is shown. Elements of the seventh embodiment that are similar to elements found in the previously discussed embodiments have been given the same reference numbers. Support bearing assembly 700 includes a plurality of deflectable tabs 190 disposed on first end portion 114 of cage 110. Preferably, three deflectable tabs 190 are equally spaced about first end 114. Each tab 190 includes an engagement portion 194 depending radially inwardly from its distal end, and each tab 190 is separated circumferentially from the remainder of the cage by a pair of gaps 192. Engagement portions 194 extend radially inwardly beyond the inner surface of cage 110, and the innermost portions of engagement portions 194 define a diameter that is less than the outer diameter of a camshaft 102 on which support bearing assembly 700 is to be installed. As such, as support bearing assembly 700 is slid along camshaft 102 to the desired axial position, contact of engagement portions 194 with the outer surface of camshaft 102 causes the corresponding deflectable tabs 190 to be deflected radially outwardly. As shown in FIG. 6B, when the desired axial position is reached, deflectable tabs 190 return to their unbiased positions as engagement portions 194 of the tabs 190 return to their undeflected positions, thereby engaging annular groove 104. Interaction of engagement portions 194 with the side walls of annular groove maintain support bearing assembly 700 in the desired axial position relative to the camshaft.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. A radial support bearing assembly for use with a shaft defining an annular groove in its outer surface, comprising:
   a substantially cylindrical cage including a central portion extending between a first end portion and a second end portion, the central portion defining a plurality of roller pockets, a first projection and a second projection extending radially outwardly from the outer surface of the cage, and at least one projection extending radially inwardly from an inner surface of the cage;
   a plurality of rollers, each roller being disposed in a respective roller pocket; and
   a substantially cylindrical outer sleeve having an inner surface and an outer surface, the outer sleeve being disposed about an outer surface of the cage so that the inner surface of the outer sleeve is adjacent the plurality of rollers, and the outer sleeve being axially retained between the first projection and the second projection,
   wherein the at least one projection is operatively engaged with the annular groove in the shaft so that the cage is axially fixed with respect to the shaft.

2. The radial support bearing assembly of claim 1, wherein the at least one projection extends radially inwardly into the annular groove of the shaft.

3. The radial support bearing assembly of claim 2, wherein the at least one projection extends circumferentially relative to the cage as well as radially inwardly.

4. The radial support bearing assembly of claim 3, wherein the at least one projection is a split away portion of the first end portion.

5. The radial support bearing assembly of claim 1, wherein the at least one projection is positioned in the annular groove by exerting a force radially inwardly on the at least one projection after the cage is slidably received on the shaft.

6. The radial support bearing assembly of claim 1, further comprising an o-ring, wherein the o-ring is disposed in the annular groove of the shaft.

7. The radial support bearing assembly of claim 6, wherein the o-ring is a split ring.

8. The radial support bearing assembly of claim 6, wherein the o-ring is slidably received between the at least one projection of the cage and the central portion of the cage so that the cage is axially fixed with respect to the shaft.

9. The radial support bearing assembly of claim 8, the cage further comprising an annular ledge extending radially outwardly from the central portion of the cage to the first end portion of the cage, wherein the annular ledge is perpendicular to a longitudinal center axis of the cage, and the o-ring is received between the annular ledge and the at least one projection of the cage.

10. The radial support bearing assembly of claim 9, wherein the at least one projection further comprises an abutment surface that is perpendicular to the longitudinal center axis of the cage and separated from the annular ledge by a first distance that is substantially equal to a first width of the o-ring taken in a direction parallel to the longitudinal center axis of the cage.

11. The radial support bearing assembly of claim 9, the cage further comprising a plurality of axial projections that extend axially outwardly from the annular ledge so that the o-ring is in contact with the distal ends of the axial projections rather than the annular ledge.

12. A radial support bearing assembly for use with a shaft defining an annular groove in its outer surface, comprising:
a substantially cylindrical cage including a central portion extending between a first end portion and a second end portion, the central portion defining a plurality of roller pockets, and at least one projection extending radially inwardly from an inner surface of the cage;
a plurality of rollers, each roller being disposed in a respective roller pocket;
an o-ring is disposed in the annular groove of the shaft; and
a substantially cylindrical outer sleeve having an inner surface and an outer surface, the outer sleeve being disposed about an outer surface of the cage so that the inner surface of the outer sleeve is adjacent the plurality of rollers,
wherein the at least one projection is operatively engaged with the annular groove in the shaft so that the cage is axially fixed with respect to the shaft.

13. The radial support bearing assembly of claim 12, wherein the o-ring is a split ring.

14. The radial support bearing assembly of claim 12, wherein the o-ring is slidably received between the at least one projection of the cage and the central portion of the cage so that the cage is axially fixed with respect to the shaft.

15. The radial support bearing assembly of claim 14, the cage further comprising an annular ledge extending radially outwardly from the central portion of the cage to the first end portion of the cage, wherein the annular ledge is perpendicular to a longitudinal center axis of the cage, and the o-ring is received between the annular ledge and the at least one projection of the cage.

16. The radial support bearing assembly of claim 15, wherein the at least one projection further comprises an abutment surface that is perpendicular to the longitudinal center axis of the cage and separated from the annular ledge by a first distance that is substantially equal to a first width of the o-ring taken in a direction parallel to the longitudinal center axis of the cage.

17. The radial support bearing assembly of claim 15, the cage further comprising a plurality of axial projections that extend axially outwardly from the annular ledge so that the o-ring is in contact with the distal ends of the axial projections rather than the annular ledge.

18. The radial support bearing assembly of claim 12, the cage further comprising a first projection and a second projection extending radially outwardly from the outer surface of the cage, the outer sleeve being axially retained between the first projection and the second projection.

19. A radial support bearing assembly for use with a shaft defining an annular groove in its outer surface, comprising:
a substantially cylindrical cage including a central portion extending between a first end portion and a second end portion, the central portion defining a plurality of roller pockets, and at least one split away of the first end extending both circumferentially relative to the case and radially inwardly from an inner surface of the cage into the annular groove of the shaft;
a plurality of rollers, each roller being disposed in a respective roller pocket;
an o-ring is disposed in the annular groove of the shaft; and
a substantially cylindrical outer sleeve having an inner surface and an outer surface, the outer sleeve being disposed about an outer surface of the cage so that the inner surface of the outer sleeve is adjacent the plurality of rollers,
wherein the at least one projection is operatively engaged with the annular groove in the shaft so that the cage is axially fixed with respect to the shaft.

* * * * *